H. W. OSTER.
THREAD CUTTING MECHANISM.
APPLICATION FILED OCT. 22, 1910.

1,047,280.

Patented Dec. 17, 1912.

4 SHEETS—SHEET 3.

Witnesses.
E. B. Gilchrist
H. R. Sullivan

Inventor
Herman W. Oster
by Thurston & Sivis
Attorneys

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

THREAD-CUTTING MECHANISM.

1,047,280.  Specification of Letters Patent.  Patented Dec. 17, 1912.

Application filed October 22, 1910. Serial No. 588,400.

*To all whom it may concern:*

Be it known that I, HERMAN W. OSTER, a citizen of the United States, residing at Cleveland, in the county of Cuyahoga and State of Ohio, have invented a certain new and useful Improvement in Thread-Cutting Mechanism, of which the following is a full, clear, and exact description.

This invention relates to improvements in the kind of thread cutting tools or machines in which the threads are cut by independently rotating cutters instead of by dies or chasers which rotate only in the sense that they go with the rotating die-carrying head.
The invention is shown embodied in the kind of a tool which is commonly called a die stock; and it is constructed with special reference to adapting it to cut threads on large pipes which, while the threads are being cut, is firmly held in a vise.

Die stocks for cutting threads on stationarily held pipes are much used by plumbers, steam fitters and the like, who, while "on the job" and therefore away from the shop, have to cut the pipes to the required length and then thread them. The die stocks which have radially movable dies or chasers, are very efficient tools; but they are open to the objection that the chasers rapidly wear and get too dull to do the work for which they are provided. Many of these die stocks have means for automatically receding the dies while they are cutting the thread in order that the threads may be tapered.
The complete primary object of this invention is to provide a practical die stock adapted for cutting tapered threads on pipes and the like, in which rotating cutters are employed instead of the usual chasers. It is clear, however, that the particular tool shown may be very readily adapted for cutting straight instead of tapered threads. It will also be apparent to those familiar with this art that many of the patentably novel features of invention are capable of use in a machine of the lathe type.

Figure 1:
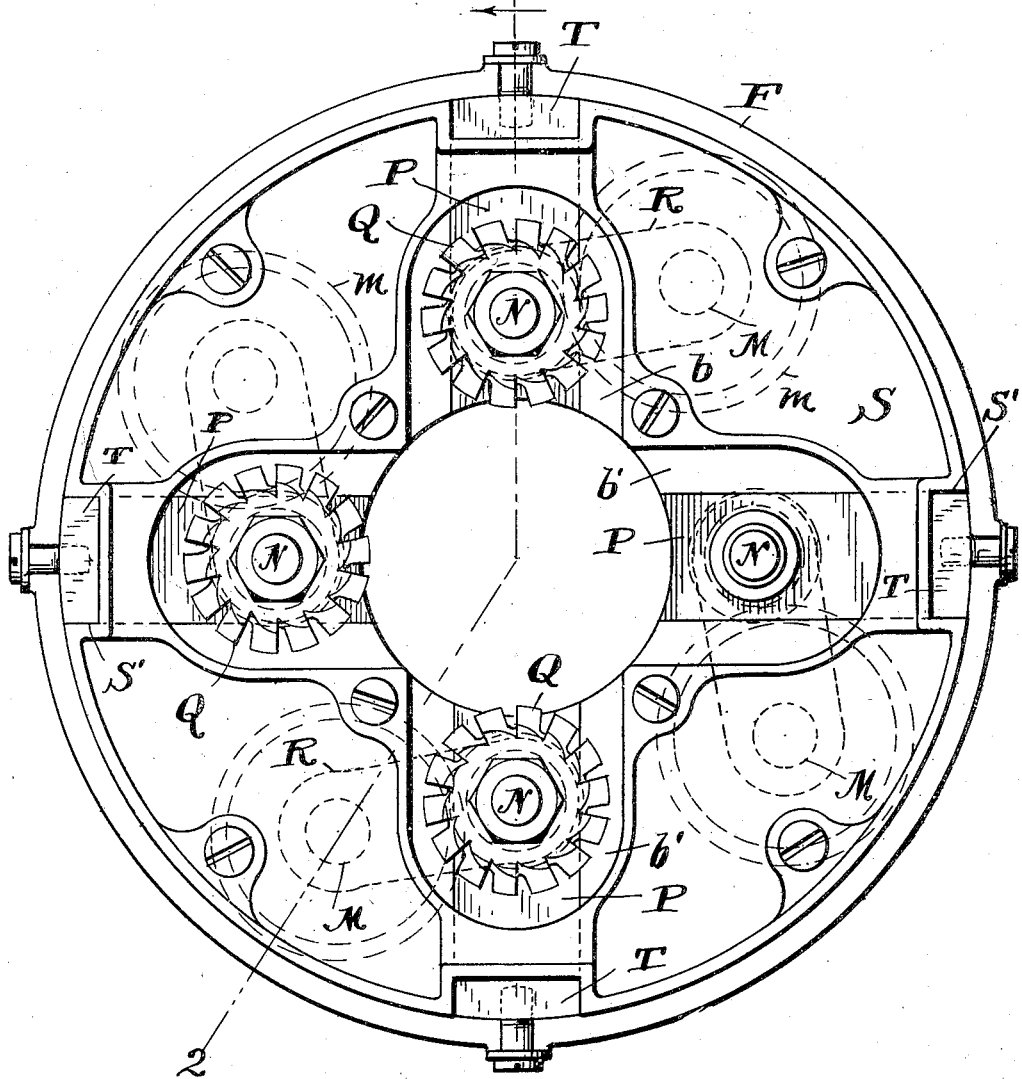
Figure 2:
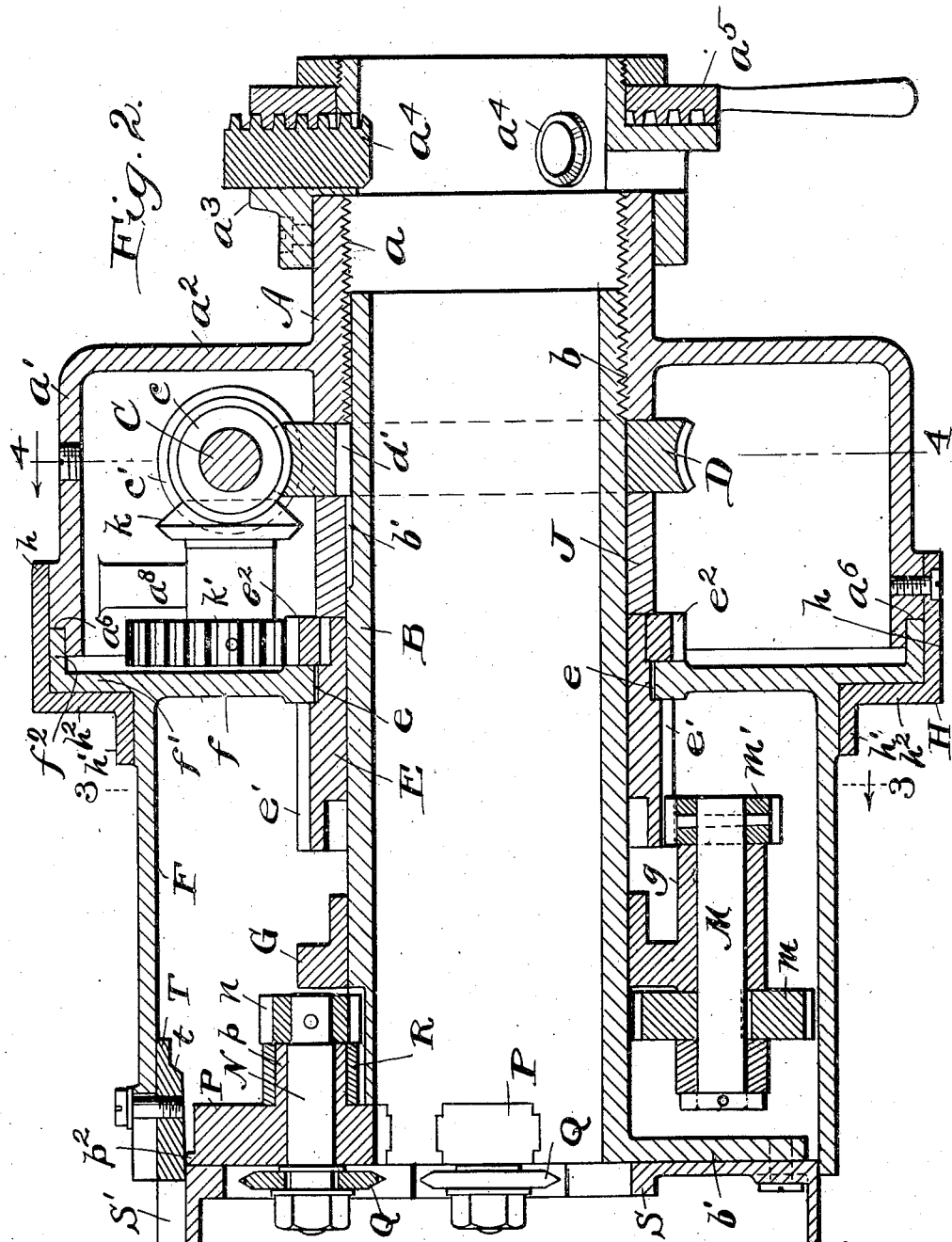
Figure 3:
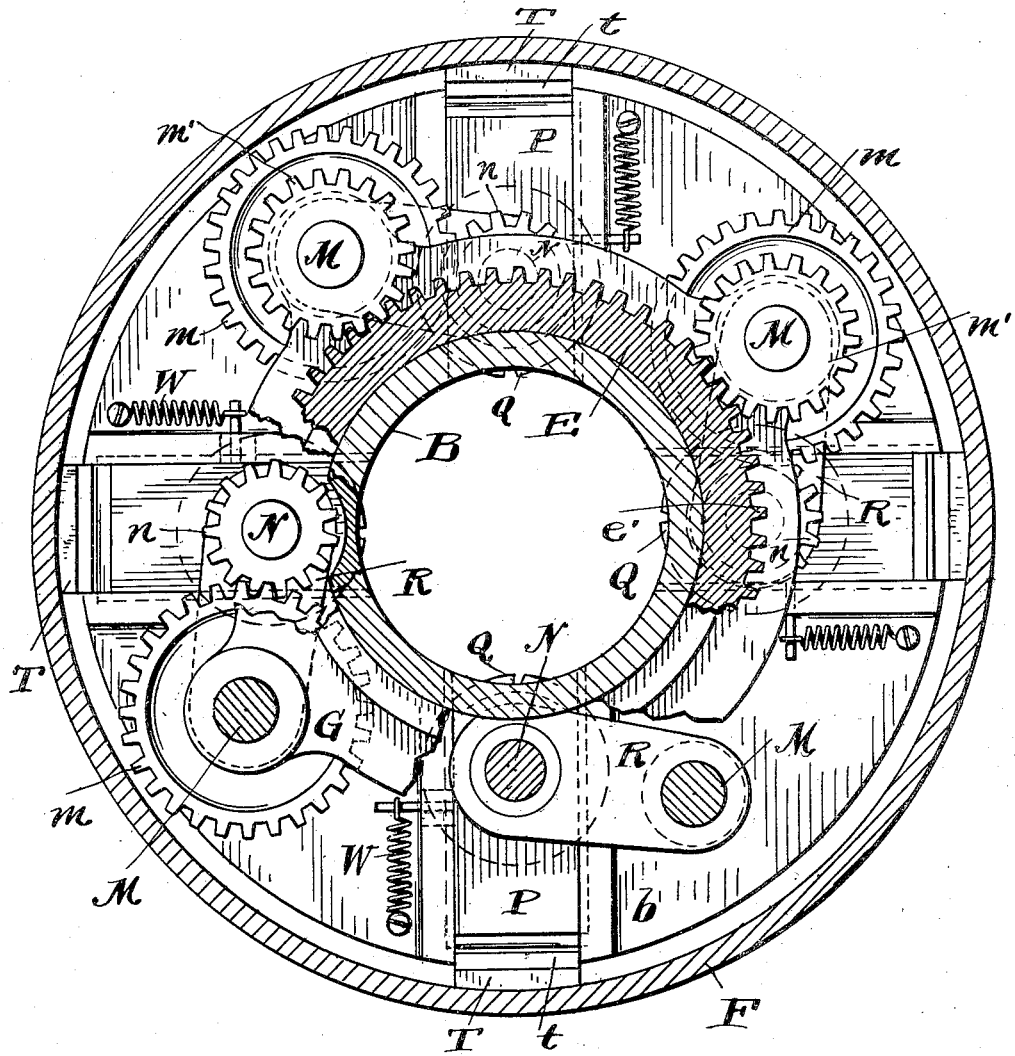
Figure 4:
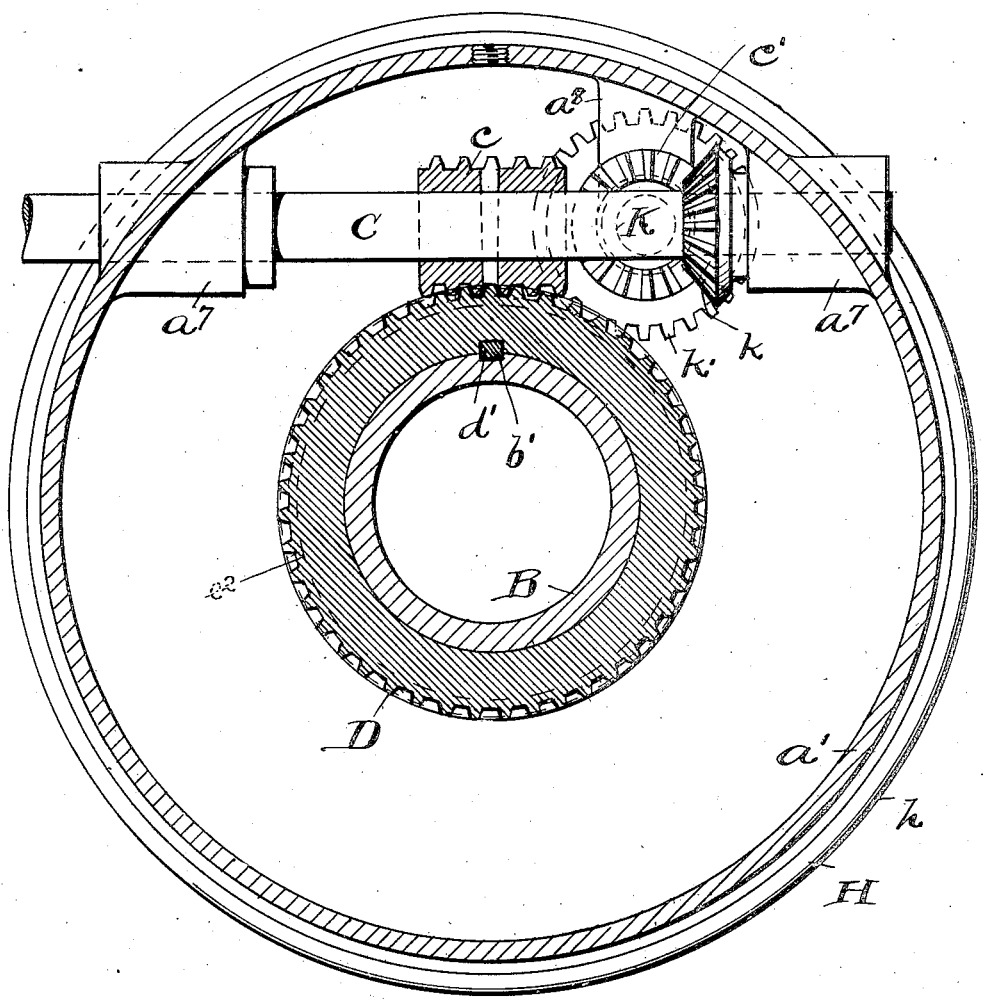

In the drawing Figure 1 is a front end view of a thread cutting tool which embodies the invention. Fig. 2 is a longitudinal sectional view in the plane indicated by line 2—2 on Fig. 1. Fig. 3 is a transverse sectional view in the plane indicated by line 3—3 on Fig. 2; and Fig. 4 is a transverse sectional view in the plane indicated by line 4—4 on Fig. 2.

Referring to the parts by letters, A represents the tubular work holder, or chuck, as it is sometimes called. This is a cylindrical tubular member through which the pipe or other "work" to be threaded may be passed; and suitable means must be provided for clamping the work axially within the work holder. The means shown are of familiar form consisting of radially movable clamping bars $a^4$, and a cam plate $a^5$ for operating them; those movable parts being carried by a ring $a^3$, which embraces and is fixed to the member A. This work holder has the internal lead screw threads $a$; and it is also formed with a housing adapted to support the operating shaft C and certain gearing to be presently referred to,—this housing comprising, as shown, an external cylindrical flange $a'$, and the web $a^2$ which connects it with the threaded part of the work holder. A cap ring H has two concentric cylindrical flanges $h$ and $h'$, of different diameters, and a connecting rib $h^2$. The larger flange $h$ embraces and is fixed to the housing flange; so that it, as well as the housing and the ring $a'$, are, in effect rigid parts of the work holder when the mechanism is in condition for use.

B represents the cutter carrier. It is a cylindrical tube having external lead screw threads $b$ which coöperate with the lead screw threads $a$ on the work holder. This tube has, at its front end, a flange $b'$, in the rear face of which radial guideways are formed for the reception of radially movable bearing blocks P. A head plate S is fixed to the outer face of the flange $b'$, wherefore it is in effect a part of the cutter carrier. In each of the blocks P, a cutter shaft N is journaled, said shafts being parallel with the axis of the device. The front ends of said shafts project through holes in the head plate, and each shaft has a milling cutter Q fixed to its projecting front end. A pinion $n$ is fixed to the rear end of each shaft N. In the construction there are four blocks P and shafts N with cutters Q and pinions $n$,—but the number is immaterial. It is however desirable that there shall be several cutters,—and the mechanism shown for turning the cutter shafts is such that several sets of such mechanisms may be accommodated without increasing the size of the supporting parts.

A collar G is mounted on the cutter carrier B—and in the construction shown this collar may turn slightly on said cutter carrier. This collar furnishes the bearings for as many shafts M as there are shafts N, said shafts being parallel with the axis of the device. Fixed to each shaft, near its projecting front end, is a gear $m$ which meshes with the associated pinion $n$. A link R is provided for keeping each shaft N in the required relation to its associated shaft M. Each link at one end embraces the front end of shaft M; and at its other end embraces a cylindrical lug $p$ on a block P concentric with shaft N. A gear $m'$ is fixed to the rear end of each shaft M,—and all of the gears $m'$, are in mesh with the long gear $e'$ on the gear sleeve E which is rotatively mounted on the cutter carrier. The shafts N and M are not permitted to move lengthwise in their several bearings; and the links R are also held against movement lengthwise of said shafts,—from which it follows that the cutters Q and the entire trains of mechanism intermediate of them and the gear $e'$ must move with the cutter carrier as it moves longitudinally relative to the work holder, due to screwing the latter into the former. So also must these trains of mechanism rotate with said cutter carrier because the shafts N are mounted in the blocks P.

A drum F is rotatively mounted on the work holder; concentric with it. The rear end of this drum is so fashioned that it may rotate partly upon the housing flange $a'$ and partly within the cap ring H; but since the flange $f$ of the drum lies between a shoulder $a^6$ on the housing and the web $h^2$ of the cup ring, this drum cannot move longitudinally with relation to the work holder. This drum F has an inwardly extended annular flange which projects into a circumferential groove $e$ in the gear sleeve E; and therefore this gear ring while permitted to rotate independently of every other part cannot move longitudinally relative to the work holder.

A pinion $e^2$ which, for convenience of construction, is made separately from gear sleeve E, is fixedly keyed to it. This pinion is in mesh with a gear $k'$ which is fixed to a shaft K,—the latter being mounted on a bearing $a^8$ which is located within and is an integral part of the housing $a'$. This shaft carries a bevel gear $k$ which meshes with a bevel gear $c'$ fixed to the main operating shaft C. This shaft C is mounted in bearings $a^7$ which are integral parts of the housing,—and extends laterally out of said housing so that it may be turned by a crank or other means applied to the projecting outer end. This shaft also has keyed to it, within the housing, a worm $c$; and this engages with a worm wheel D,—the latter having a sliding tongue and groove connection with the cutter carrier which passes through it. This worm wheel is kept in the required relation to the worm by engaging on one side with the inner end of the threaded part of the work holder, and by engaging at its other side with a distance sleeve J placed between it and the end of the gear sleeve E.

The blocks P, are each under the influence of a spring W acting to move them radially outward,—and the outward movement of each is controlled by a pattern block T. These pattern blocks,—of which there is one for each block P, are removably fixed to the inner surface of drum F at the front end thereof. Each of these pattern blocks is slidably fitted in a longitudinal groove $s'$ in the periphery of the plate S. Because of this engagement the drum F must rotate with the cutter carrier. But since the latter moves longitudinally as it turns, and the drum cannot so move, the outer ends of the blocks P will slide on the inner faces of the pattern blocks T. These inner faces may be slightly beveled as shown, so that as the cutter carrier moves longitudinally as the thread is being cut the blocks will be gradually retracted outward, whereby the cutters will cut what is known as a tapered thread. Additionally the inner faces of these pattern blocks may be abruptly beveled outward as at $t$, so that when the thread has been cut the required distance the blocks P will come into engagement with the surfaces $t$ and will rapidly move outward so as to completely withdraw the cutters from the work.

The invention is shown embodied in a form which generally goes by the name of die stock. To use such a die stock the cylindrical pipe or other piece of work to be threaded is usually clamped in a vise. Then the tool is slipped over the end and the work holder or chuck is clamped to the work. Then by turning the shaft C the cutter carrier will be rotated and will screw into the work holder. At the same time, through the described mechanism, the various cutters will be rapidly rotated, the result being that they will cut a spiral thread upon the work, the pitch of said thread being determined by the lead screw connection between the cutter carrier and the work holder. As this work is going on the gears $m'$ will slide lengthwise of the gear sleeve E, but the operative intermeshing of the gear $e'$ and the several gears $m'$ will not be disturbed.

Reference has been made to the fact that the sleeve G is capable of turning slightly upon the cutter carrier. This relative rotary movement is required with the construction shown so that, as the blocks P move radially, this sleeve G may be turned slightly in order to prevent any binding or sticking of the links T upon the parts which they embrace. This binding might also be prevented by making the holes in the links a little larger than the parts which go through these holes, and in that event the sleeve G might be fixed to the cutter carrier.

I claim—

1. In screw cutting mechanism, the combination with a tubular work holder adapted to be clamped upon the work, a tubular cutter carrier having a lead screw connection with the work holder, a bearing block mounted on said cutter carrier, and a rotatable cutter shaft mounted in said bearing block, of a gear concentric with the cutter carrier and rotatably mounted thereon, a train of mechanism intermediate of said gear and cutter shaft, a worm wheel which embraces and has a sliding tongue and groove connection with the cutter carrier, a laterally extended shaft mounted upon the work holder, a worm fixed to said shaft engaging with the worm wheel, and mechanism intermediate of said shaft and the gear referred to for turning the latter at a speed greater than the speed of the cutter carrier.

2. In screw cutting mechanism, the combination with a tubular work holder adapted to be clamped upon the work, a tubular cutter carrier having a lead screw connection with the work holder, a bearing block mounted on said cutter carrier, a rotatable cutter shaft parallel with the axis of the cutter carrier and mounted in said bearing block, of a gear concentric with the cutter carrier and rotatably mounted thereon, mechanism mounted on the work holder for rotating said gear, a sleeve loosely embracing the cutter carrier, a shaft mounted therein with its axis parallel with the axis of the cutter carrier, two intermeshing pinions fixed respectively to this shaft and to the cutter shaft, a link for holding these two shafts in proper relation to each other, a pinion fixed to said shaft in mesh with the gear which is rotatably mounted upon the cutter carrier, and mechanism carried by the work holder for rotating the cutter carrier.

3. In screw cutting mechanism, the combination with a tubular work holder adapted to be clamped upon the work, a tubular cutter carrier having a lead screw connection with the holder, a bearing block carried by said cutter carrier, a rotatable cutter shaft parallel with the axis of the cutter carrier and mounted in said block, a pinion fixed to the rear end of said cutter shaft, a sleeve embracing the cutter carrier, a shaft rotatably mounted in said sleeve on an axis parallel with the axis of the cutter carrier, a pinion fixed to said shaft and meshing with the pinion on the cutter shaft, means for holding these gears in proper meshing relation, a pinion fixed to the rear end of the shaft which is mounted in said sleeve, a gear sleeve rotatably mounted upon the cutter carrier and having a wide gear meshing with the last mentioned pinion and provided also with a gear of large diameter, a shaft mounted on the work holder having a pinion which engages with the last mentioned gear, mechanism mounted on the work holder for turning the last mentioned shaft and for turning the cutter carrier.

4. In screw cutting mechanism, the combination with a tubular work holder adapted to be clamped upon the work, a tubular cutter carrier having a lead screw connection with the work holder, a radially movable bearing block mounted on said cutter carrier, a rotatable cutter shaft parallel with the axis of the cutter carrier and mounted in said block, a pinion fixed to the rear end of said cutter shaft, a sleeve embracing the cutter carrier, a shaft rotatably mounted in said sleeve on an axis parallel with the axis of the cutter carrier, a pinion fixed to said shaft and meshing with the pinion on the cutter shaft, means for holding these gears in proper meshing relation, a pinion fixed to the rear end of the shaft which is mounted in said sleeve, a gear sleeve rotatably mounted upon the cutter carrier and having a wide gear meshing with the last mentioned pinion and provided also with a gear of large diameter, a shaft mounted on the work holder having a pinion which engages with the last mentioned gear, mechanism mounted on the work holder for turning the last mentioned shaft, a drum rotatably mounted upon the work holder, means preventing relative endwise movement of said drum and work holder, said drum having an inwardly extended annular flange, and the gear sleeve having an annular groove which receives the inner periphery of said flange.

5. In screw cutting mechanism, the combination with a tubular work holder adapted to be clamped upon the work, a tubular cutter carrier having a lead screw connection with the holder, a radially movable bearing block mounted on said cutter carrier, a rotatable cutter shaft mounted in said block, and a pinion fixed to the rear end of said cutter shaft, of a sleeve embracing the cutter carrier, a shaft rotatably mounted in said sleeve on an axis parallel with the axis of the cutter carrier, a pinion fixed to said shaft and meshing with the pinion on the cutter shaft, means for holding these gears in proper meshing relation, a pinion fixed to the rear end of the shaft which is mounted in said sleeve, a gear sleeve rotatably mounted upon the cutter carrier and having a wide gear meshing with the last mentioned pinion and provided also with a gear of large diameter, a shaft mounted on the work holder having a pinion which engages with the last mentioned gear, mechanism mounted on the work holder for turning the last mentioned shaft and the cutter carrier, a drum rotatably mounted upon the work holder, means preventing relative endwise movement of said drum and work holder,—said drum having an inwardly extended annular flange, and the gear sleeve having an annular groove which receives the inner periphery of said flange, the bearing for the cutter shaft being a radially movable block, and said drum having a removable block whose inner face engages with the rear end of said radially movable bearing block, and the cutter carrier having longitudinal grooves in its periphery in which said removable blocks project and slide.

6. In screw cutting mechanism, the combination with a tubular work holder adapted to be clamped upon the work, a tubular cutter carrier having a lead screw connection with the work holder, a bearing block mounted on said cutter carrier, and movable toward and away from the axis thereof, a rotatable cutter shaft mounted in said bearing block, a member which shares with the work holder its condition as to endwise movement relative to the cutter carrier and shares with the cutter carrier its condition as to rotary motion relative to the work holder, the said member having a pattern surface with which the said bearing block engages to limit its outward movement, and mechanism for rotating the cutter carrier at one speed and for rotating the cutter shaft at a higher speed.

7. In screw cutting mechanism, the combination with a tubular work holder adapted to be clamped upon the work, a tubular cutter carrier having a lead screw connection with the work holder, a radially movable block bearing mounted on said cutter carrier, a rotatable cutter shaft parallel with the axis of the cutter carrier and mounted in said block, the combination with the parts specified of a gear concentric with the cutter carrier and rotatably mounted thereon, mechanism mounted in the work holder for rotating said gear, a train of mechanism intermediate of said gear and cutter shaft, a driving shaft mounted in bearings on the work holder and lying in a plane at right angles to the axis of the work holder, mechanism by which this shaft will turn the cutter carrier and other mechanism whereby the turning of this shaft will cause the rotation of the cutter shaft at high speed, said driving shaft having a worm and a worm wheel having a sliding tongue and groove connection with the cutter carrier, and means preventing endwise movement of this worm wheel relative to the work holder.

8. In screw cutting mechanism, the combination with a tubular work holder adapted to be clamped upon the work, a tubular cutter carrier having a lead screw connection with the work holder, a plurality of radially movable bearing blocks mounted upon said cutter carrier, a rotatable cutter shaft mounted in each of said bearing blocks, a collar embracing said cutter carrier, a plurality of intermediate shafts parallel with the axis of the cutter rotatably mounted in said collar, each of said shafts having on its front end a pinion which meshes with a pinion on one of the cutter shafts, and having at its rear end a pinion, a gear sleeve which is rotatably mounted upon the cutter carrier and which meshes with said rear pinions, mechanism holding the gears on the cutter shafts and the gears on the intermediate shafts in meshing relation, and mechanism mounted on the work holder for turning the cutter carrier and for turning said gear sleeve at a higher speed.

9. In screw cutting mechanism, the combination with a tubular work holder adapted to be clamped upon the work, a tubular cutter carrier having a lead screw connection with the work holder, a plurality of radially movable bearing blocks mounted upon said cutter carrier, a rotatable cutter shaft mounted in each of said bearing blocks, a collar embracing said cutter carrier, a plurality of intermediate shafts parallel with the axis of the cutter rotatably mounted in said collar, each of said shafts having at its front end a pinion which meshes with a pinion on one of the cutter shafts, and at its other end a pinion, which meshes with the gear on the gear sleeve, a gear sleeve which is rotatably mounted upon the cutter carrier, mechanism holding the gears on the cutter shafts and the gears on the intermediate shafts in meshing relation, and mechanism mounted on the work holder for turning the cutter carrier and for turning the gear sleeve at a higher speed, a drum which is rotatably mounted upon the work holder, means for preventing relative endwise movement of this drum and the work holder, said drum having an inwardly extended annular flange, and the gear sleeve having an annular groove which receives said inwardly extended flange, pattern blocks fixed to this drum in engagement with the said bearing blocks, the cutter carrier having peripheral longitudinally extended grooves in which said pattern blocks fit and slide.

10. In thread cutting mechanism, the combination with a tubular work holder adapted to be clamped upon the work, a tubular cutter carrier having a lead screw connection with the work holder, a plurality of radially movable blocks mounted on the cutter carrier, a cutter shaft rotatably mounted in each of said bearing blocks, a drum rotatably mounted on the work holder but held against longitudinal movement relative thereto, means compelling this drum and cutter carrier to rotate in unison, a plurality of pattern blocks fixed to said drum in position to be engaged by said bearing blocks, a single gear rotatably mounted on the cutter carrier, means preventing the endwise movement of said single gear relative to the work holder, a plurality of mechanisms intermediate of said gear and the several cutter shafts, the rear terminal member of each of said trains of mechanism being a gear adapted to slide in mesh with the single gear referred to, and mechanism carried by the work holder for rotating said single gear and cutter carrier at different speeds.

In testimony whereof, I hereunto affix my signature in the presence of two witnesses.

HERMAN W. OSTER.

Witnesses:
E. L. THURSTON,
H. R. SULLIVAN.